United States Patent
Hoeft et al.

(10) Patent No.: US 11,237,821 B1
(45) Date of Patent: Feb. 1, 2022

(54) CONFIGURING ZERO-DOWNTIME UPGRADES USING AUTOMATED DEVELOPMENT AND TEST ANALYSIS

(71) Applicant: SAP SE, Walldorf (DE)

(72) Inventors: Kerstin Hoeft, Wiesloch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/952,191

(22) Filed: Nov. 19, 2020

(51) Int. Cl.
| | | |
|---|---|---|
| G06F 8/656 | (2018.01) | |
| G06F 11/36 | (2006.01) | |
| G06F 8/71 | (2018.01) | |
| G06F 16/22 | (2019.01) | |

(52) U.S. Cl.
CPC ............... G06F 8/656 (2018.02); G06F 8/71 (2013.01); G06F 11/3636 (2013.01); G06F 16/2282 (2019.01)

(58) Field of Classification Search
CPC ........ G06F 8/656; G06F 8/71; G06F 11/3636; G06F 16/2282
See application file for complete search history.

(56) References Cited

U.S. PATENT DOCUMENTS

| | | | | |
|---|---|---|---|---|
| 8,521,706 | B2* | 8/2013 | Alpern | G06F 16/217 |
| | | | | 707/695 |
| 9,244,914 | B2* | 1/2016 | Trumbull | G06F 16/00 |
| 9,436,724 | B2 | 9/2016 | Driesen et al. | |
| 9,519,675 | B2* | 12/2016 | Specht | G06F 16/211 |
| 9,767,424 | B2 | 9/2017 | Biewald et al. | |
| 9,910,665 | B2* | 3/2018 | Haferkorn | G06F 16/213 |
| 10,303,665 | B2* | 5/2019 | Engelko | G06F 16/211 |
| 10,356,214 | B2* | 7/2019 | Joshi | G06F 9/45558 |
| 10,871,962 | B2 | 12/2020 | Burkhardt | |
| 2010/0088281 | A1* | 4/2010 | Driesen | G06F 11/1433 |
| | | | | 707/641 |
| 2010/0138821 | A1* | 6/2010 | Driesen | G06F 8/65 |
| | | | | 717/168 |
| 2014/0101646 | A1* | 4/2014 | Buzaski | G06F 16/2372 |
| | | | | 717/168 |
| 2016/0246833 | A1* | 8/2016 | Eberlein | G06F 8/656 |
| 2020/0159852 | A1 | 5/2020 | Meissner et al. | |
| 2021/0165694 | A1* | 6/2021 | Nabi | G06F 11/1433 |

OTHER PUBLICATIONS

U.S. Appl. No. 16/952,301, Hoeft et al., filed Nov. 19, 2020.

* cited by examiner

*Primary Examiner* — Douglas M Slachta
(74) *Attorney, Agent, or Firm* — Fish & Richardson P.C.

(57) ABSTRACT

Implementations include, during development of a second version within a development environment, tracing activities to determine development tables, the second version including changes that are incompatible with the first version, the development tables including deploy tables, activation tables, and troubleshooting tables, computing, by a configuration generator, an upgrade configuration based on the development tables, the upgrade configuration defining tables to deploy the changes during an upgrade, the tables being computed based on the development tables, during the upgrade: continuing production use of a first version using a first runtime at least partially including a first data schema, and establishing a second runtime at least partially by defining a second data schema within the database system using the upgrade configuration, the second data schema including the tables, and completing the upgrade by switching production use to the second version from the first version.

20 Claims, 10 Drawing Sheets

CONFIGURING ZERO-DOWNTIME UPGRADES USING AUTOMATED DEVELOPMENT AND TEST ANALYSIS

BACKGROUND

Entities, such as software developers and/or vendors, provide software and services. Example software can include enterprise software. In some examples, enterprise software can include application software (an application) that interacts with one or more databases. For example, an application can be hosted on one or more application servers and a user can interact with the application using a client device. In some examples, user interaction can result in data being read from, written to, and/or modified within one or more databases provided in one or more database systems.

During a lifecycle of the application and/or database, one or more maintenance operations may be required. Example maintenance operations include upgrading, patching and testing. In order to perform such maintenance procedures, the application, and/or database may be taken offline, such that users are unable to interact with the application and/or database. This is referred to as downtime. Although software providers have strived minimize downtime, achieving zero-downtime during such maintenance procedures has been elusive. An example goal for zero-downtime includes deploying an upgrade with a maximum read-only usage phase (e.g., maximum of 5 minutes).

SUMMARY

Implementations of the present disclosure are directed to an automated test and development platform that supports zero-downtime during upgrade of an application. More particularly, implementations of the present disclosure are directed to an automated test and development platform that provides tracing and analysis of development of a to-be-deployed version of an application, and computation of an upgrade configuration that is used during deployment of the version of the application to a production system to mitigate downtime.

In some implementations, actions include, during development of a second version within a development environment, tracing activities to determine sets of development tables, the second version including changes that are incompatible with the first version, the set of development tables including a set of deploy tables, sets of activation tables, and sets of troubleshooting tables, computing, by a configuration generator, an upgrade configuration based on the set of development tables, the upgrade configuration defining a set of tables to deploy the changes during an upgrade, the set of tables being computed based on the sets of development tables, during the upgrade: continuing production use of a first version of the application using a first runtime at least partially including a first data schema, and establishing a second runtime at least partially by defining a second data schema within the database system using the upgrade configuration, the second data schema including the set of tables, and completing the upgrade by switching production use to the second version of the application from the first version of the application. Other implementations of this aspect include corresponding systems, apparatus, and computer programs, configured to perform the actions of the methods, encoded on computer storage devices.

These and other implementations can each optionally include one or more of the following features: computing an upgrade configuration based on the set of development tables at least partially includes: defining a set of system read tables as a union of a set of troubleshooting read tables of the sets of troubleshooting tables and a set of activation read tables of the sets of activation tables, the set of tables including the set of system read tables, and defining a set of system read-write tables as a union of a set of troubleshooting read-write tables of the sets of troubleshooting tables and a set of activation read-write tables of the sets of activation tables, the set of tables including the set of system read-write tables; computing an upgrade configuration based on the set of development tables at least partially includes: defining a set of deploy and system read tables as an intersection of the set of deploy tables and the set of system read tables, and defining a set of deploy and system read-write tables as an intersection of the set of deploy tables and the set of system read-write tables; the set of deploy tables is provided from a first database trace representing changes during the development of the second version of the application, the sets of activation tables are provided from a second database trace representing tables accessed during activation, and the sets of troubleshooting tables are provided from a third database trace representing tables accessed during troubleshooting; actions further include constraining, by a development constraining tool, continued development of the second version at least partially in response to computing the upgrade configuration; the upgrade configuration defines a set of system database objects that are to be deployed to the green runtime during the upgrade, the set of system database objects being computed as an intersection of a set of deploy database objects and a set of troubleshooting database objects determined during development of the second version; and defining a second data schema within the database system using the upgrade configuration includes copying tables and content of tables in first data schema to the second data schema, and continuously replicating at least a portion of changes in the first data schema to the second data schema occurring in production use of the first version of the application using the first runtime during the upgrade.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to an automated test and development platform that supports zero-downtime during upgrade of an application. More particularly, implementations of the present disclosure are directed to an automated test and development platform that provides tracing and analysis of development of a to-be-deployed version of an application, and computation of an upgrade configuration that is used during deployment of the version of the application to a production system to mitigate downtime. Implementations can include actions of, during development of a second version within a development environment, tracing activities to determine sets of development tables, the second version including changes that are incompatible with the first version, the set of development tables including a set of deploy tables, sets of activation tables, and sets of troubleshooting tables, computing, by a configuration generator, an upgrade configuration based on the set of development tables, the upgrade configuration defining a set of tables to deploy the changes during an upgrade, the set of tables being computed based on the sets of development tables, during the upgrade: continuing production use of a first version of the application using a first runtime at least partially including a first data schema, and establishing a second runtime at least partially by defining a second data schema within the database system using the upgrade configuration, the second data schema including the set of tables, and completing the upgrade by switching production use to the second version of the application from the first version of the application.

Figure 1:
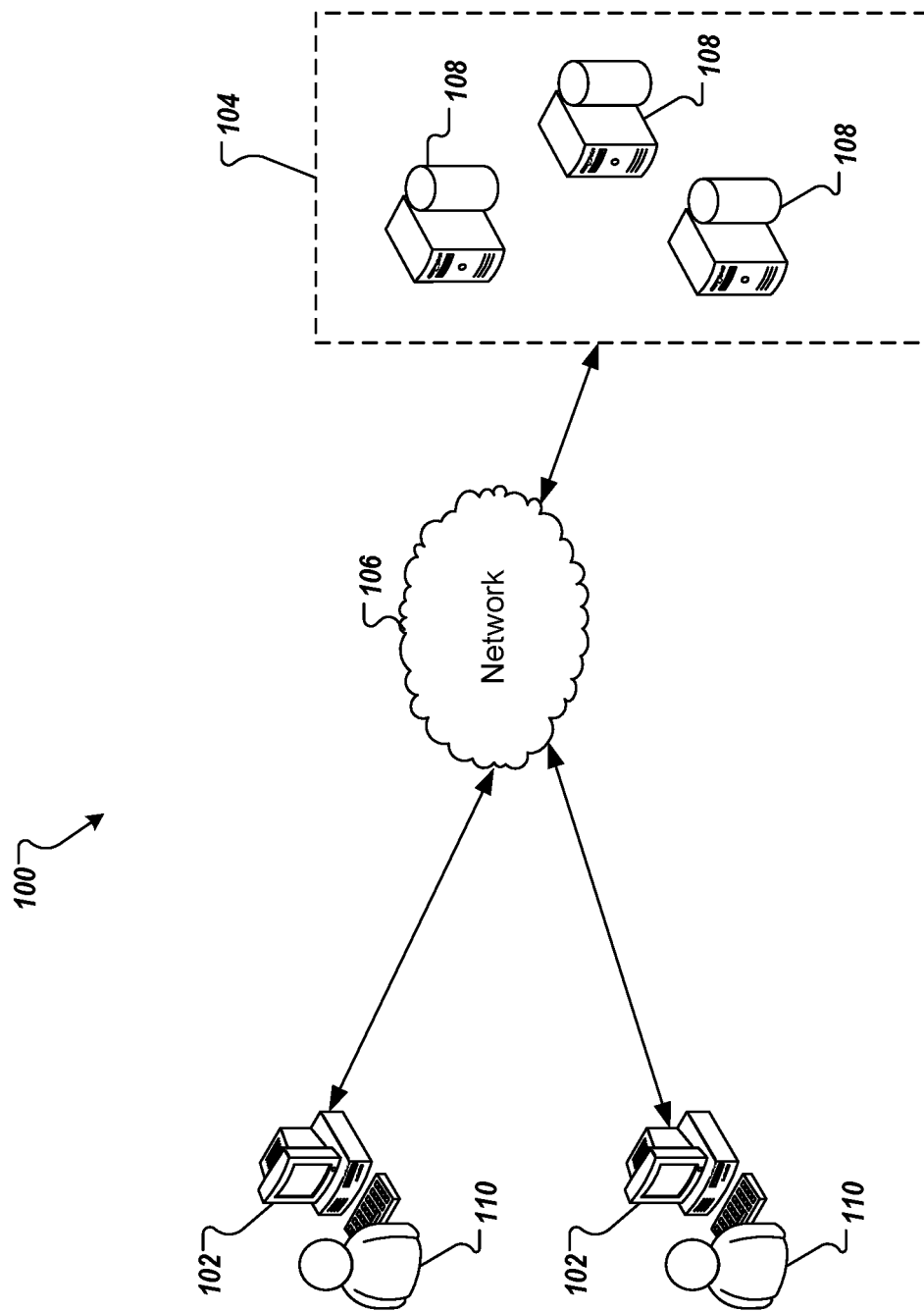
FIG. 1 depicts an example architecture that can be used to execute implementations of the present disclosure.

FIG. 1 depicts an example architecture 100 in accordance with implementations of the present disclosure. In the depicted example, the example architecture 100 includes one or more client devices 102, a server system 104 and a network 106. The server system 104 includes one or more server devices 108. In the depicted example, respective users 110 interact with the client devices 102. In an example context, a user 110 can include a user, who interacts with an application that is hosted by the server system 104. In another example context, a user 110 can include a user, who interacts with the server system 104, as described in further detail herein.

In some examples, the client devices 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices, e.g., the client devices 102, over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An-memory database can be contrasted with database management systems that employ a disk storage mechanism. In some examples, in-memory databases are faster than disk storage databases, because internal optimization algorithms can be simpler and execute fewer CPU instructions, e.g., require reduced CPU consumption. In some examples, accessing data in an in-memory database eliminates seek time when querying the data, which provides faster and more predictable performance than disk-storage databases.

Implementations of the present disclosure are described in further detail herein with reference to an example context. The example context includes business applications that are executed in a client-server architecture, such as the example architecture 100 of FIG. 1. In some examples, business applications can be provided in a business suite that includes two or more business applications. Example business applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications).

Referring again to FIG. 1, and in the example context, one or more applications can be hosted by the server system 104. A user 110 can interact with an application using the client device 102. More specifically, a session can be established between the client device 102 and one or more server devices 104, during which session the user 110 is able to interact with one or more applications hosted on the server system 104. The one or more applications can enable the user to interact with data stored in one or more databases. In some examples, interactions can result in data being stored to the database, deleted from the database, and/or edited within the database.

In some implementations, applications and/or databases undergo lifecycle management. In some examples, lifecycle management can include executing an upgrade procedure.

An example upgrade procedure can include upgrading software. For example, an upgrade from a first version (e.g., V1) to a second version (e.g., V2). An example upgrade can include changes to a data schema of the database. In some examples, a data schema (also referred to as database schema) is a data structure that defines how data is to be stored in the database. In some examples, the database schema can be defined in a formal language that is supported by a database management system (DBMS), and can include a set of formulas (also referred to as constraints) imposed on the database. In general, a data schema can be described as a catalog that specifies all database objects that can be stored in the database. In some examples, different data schemas (e.g., V1 versus V2), can have different objects with the same object name, but different structures.

As introduced above, the execution of maintenance procedures, such as an upgrade) can result in downtime (e.g., unavailability) of an application and/or database. Further, for applications, downtime windows for maintenance are a factor to user experience that hinders use of applications. For example, a vendor of an application can develop an upgrade to the application, which is in production use by customers. In some instances, it is difficult to set a time for the downtime windows to eliminate the impact on customers. For example, customers may access the application from different time zones. To alleviate this, the concept of zero-downtime maintenance is introduced to provide continuous (or approximately continuous) availability of an application during maintenance procedures and eliminate negative effects of user experience due to the downtime windows.

In providing an upgrade, the part of the underlying database system that is related to or is affected by the upgrade should be identified before the upgrade. For example, an application can include, without limitation, S/4HANA application, provided by SAP SE of Walldorf, Germany. In the S/4HANA application, an upgrade can include new data dictionary (DDIC) features and new DDIC content using these features in the new version of the application (e.g., V2), as compared to a previous version (e.g., V1). In general, the DDIC includes metadata about the data objects to be provided in the database system. Example data objects include, without limitation, tables, indexes, views, and structures. In this example, the new data dictionary features and/or new content results in the previous version (V1) being incompatible with the new version (V2).

In providing an upgrade, which part of the database system are required to be called is also to be identified. The part of the system may include artifacts and tables related to the DDIC content. Once the part of the database system is identified, the DDIC content can be managed together with this part of the database system. In some instances, situations might become more complex as the set of tables and artifacts used in the system to be called in the upgrade varies over time. For example, during the upgrade, a set of batch jobs or remote function may be called to execute actions in the database system. These actions need certain generic functionality of the database system in addition to the functionality called. The dependency tree of the functions used, and the required artifacts and tables is dynamic and can typically not be computed statically.

On the other hand, during the upgrade, the database system should be able to run basic troubleshooting functionality, if any problem occurs. While functionalities of the upgrade can be automatically identified in a deployment test during the upgrade, identifying troubleshooting functionality requires different approaches. The set of artifacts and tables used by the troubleshooting transactions is also subject to change after the upgrade.

As discussed above, the set of artifacts and tables identified to be related to the upgrade are sought to be minimized, because these artifacts and tables will typically be cloned during the upgrade. Minimization enables a smaller memory footprint to be required. Identifying the complete database system (or a designed subset of the database system), which can be referred to as the "BASIS" infrastructure, as the required or related part of the upgrade is possible, but this would lead to significant overhead and long runtimes. As a result, procedures can define restrictions on the set of required tables (e.g., no customer extensibility, no complex structure changes).

In view of the foregoing, and as introduced above, implementations of the present disclosure provide an automated test and development platform that supports zero-downtime during upgrade of an application. More particularly, implementations of the present disclosure are directed to an automated test and development platform that provides tracing and analysis of development of a to-be-deployed version of an application, and computation of an upgrade configuration that is used during deployment of the version of the application to a production system without downtime. As described herein, implementations of the present disclosure enable zero-downtime upgrade of incompatible versions.

In some examples, the to-be-deployed version is referred to herein as second version (V2) or a n+1 version ($V_{n+1}$) relative to a deployed version, which is also referred to herein as a first version (V1) or a n version ($V_n$). In some implementations, and as described in further detail herein, an upgrade tool executes the upgrade using the upgrade configuration to provide infrastructure data corresponding to the to-be-deployed version, the upgrade configuration defining a set of tables for the infrastructure data. In this example, the second version includes changes that result in incompatibility between the first version and the second version. Example changes include, without limitation, changes to a data dictionary. For example, and without limitation, changes can include new functionality in the data dictionary (e.g., a new field type, such as "geospatial") and data dictionary content, such as objects using the new functionality (e.g., a table definition with the new field of type "geospatial").

To provide further context for implementations of the present disclosure, a so-called blue-green deployment for an upgrade is described. In some examples, the blue-green deployment can be used to provide zero-downtime deployments of new software versions. The name blue-green deployment is derived from analogy to mechanisms used for runtime blue-green deployments. In runtime blue-green deployments, a new (green) runtime is deployed in parallel to a current (blue) runtime. After deployment, users are re-directed to the green runtime, and the blue runtime is stopped.

The blue-green deployment can be used for scenarios including so-called code push down, in which database objects, such as views, table functions, and procedures, are pushed to the database. In some examples, a separate database schema is used as the runtime environment for the code in the database. This schema is referred to as an access schema and includes the code objects. A separate, so-called data schema holds the persistency. The application only has access to the access schema, and objects in the data schema are exposed as views to the access schema. During the blue-green deployment, a new access schema (green) is provided for the target version (e.g., V2) in parallel with the current access schema (blue) used by the source version (e.g., V1, also referred to as source, and/or production). Accordingly, during the deployment (upgrade), there are multiple access schemas existing at the same time (e.g., blue, and green).

The blue-green deployment enables structure, and name abstraction. For example, a view layer hides structure changes, and content changes in the data schema during the deployment. In some examples, new columns can be added during the deployment. The new columns are not selected by the view in the blue access schema. A table column can have a different name than specified (e.g., in a data dictionary). In this manner, complex type changes can be performed without affecting availability of the table data. For example, a new column can be added with the target type and populated with data. In the green access schema, the target column is exposed instead of the previous column.

As another example, a table can have a different name than specified (e.g., in the data dictionary). This enables a shadow table to be created and populated for a production-use table. In the green access schema, the new table is then exposed instead of the old table. In some examples, obsolete columns, and tables are deleted from the persistency after the deployment is complete. As another example, a rename column, and a rename table traditionally require an exclusive database lock, which would result in downtime. To avoid this, the names of the tables in the data schema are not adjusted to the data dictionary names after the deployment, and remain to be used during the release. The name differences are shielded from the application by the view layer in the access schema.

Implementations of the present disclosure include a deploy tool (e.g., a zero-downtime maintenance (ZDM) deploy tool) also referred to herein as an upgrade tool. An example ZDM procedure, and respective deploy tool (referred to as an upgrade tool) are described in further detail in commonly assigned, U.S. Pat. No. 10,303,665, filed on Sep. 24, 2014, the disclosure of which is expressly incorporated herein by reference in its entirety for all purposes.

In accordance with implementations of the present disclosure, and as described in further detail herein, zero-downtime upgrade of applications is provided by tracing and analyzing during development, generating an upgrade configuration, and performing a blue-green deployment using the upgrade configuration. More particularly, the development of changes to be included in a new version, as well as the deployment of the changes and troubleshooting actions during the deployment are traced and analyzed during development. Data provided from the tracing and analyzing is used to compute the upgrade configuration, which enables deploying the change to a production system without downtime. In some examples, the upgrade configuration addresses incompatibility between the first version and the second version to enable the zero-downtime upgrade. During the zero-downtime upgrade, an environment (green) is established in the production system, to which the second version is to be deployed, and deployment is completed.

Figure 2A:
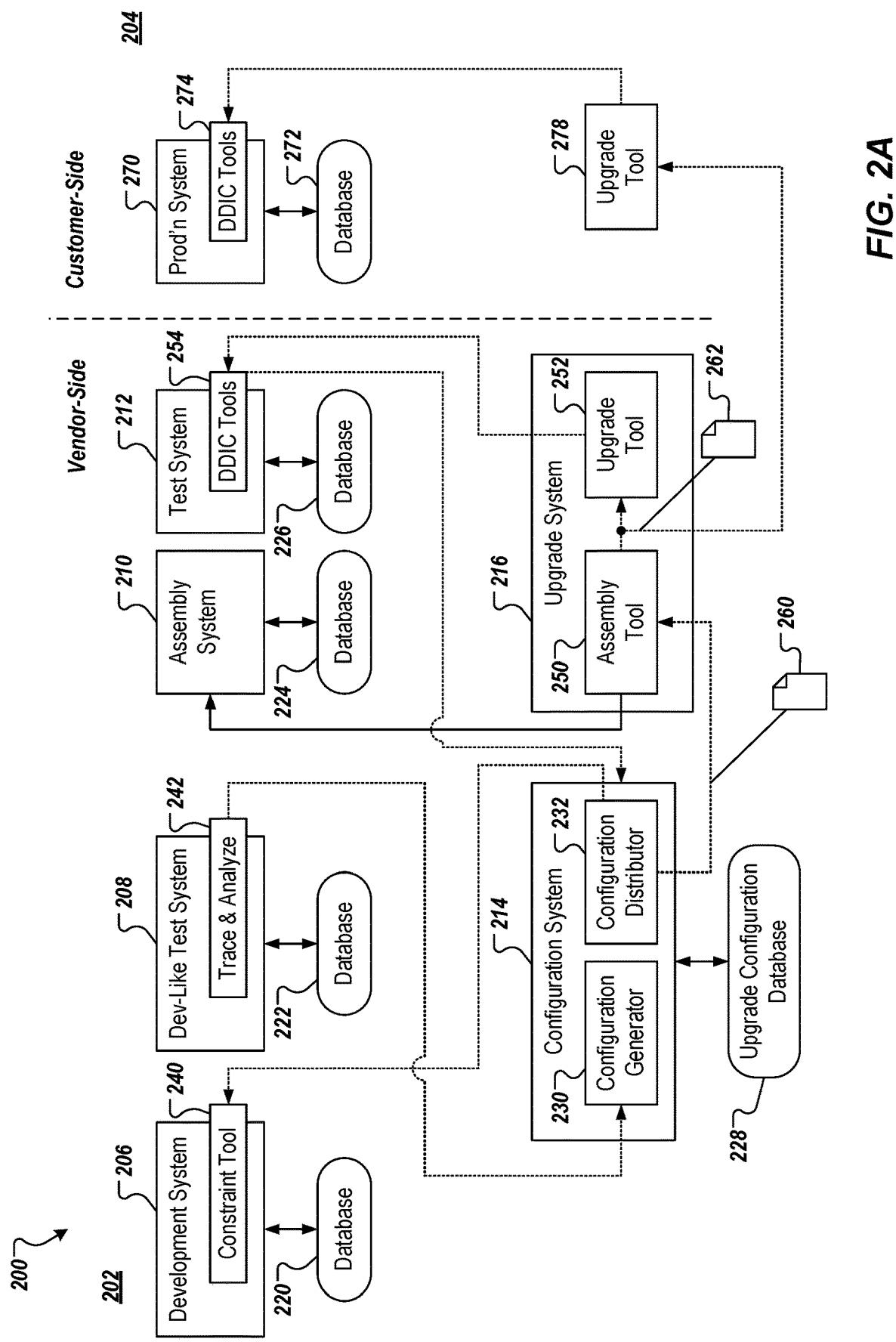
FIG. 2A depicts a conceptual architecture in accordance with implementations of the present disclosure.

FIG. 2A depicts a conceptual architecture 200 in accordance with implementations of the present disclosure. In the example of FIG. 2A, the development platform 200 includes a vendor side 202 and a customer side 204. In some examples, the vendor side 202 includes components providing at least a portion of an automated test and development platform. In further detail, the vendor side includes a development system 206 with corresponding database 220, a development-like (dev-like) test system 208 with corresponding database 222, an assembly system 210 with corresponding database 226, a configuration system 214, an upgrade system 216, and an upgrade configuration database 228. The customer side 204 includes a production system 270 with corresponding database 272 and an upgrade tool 278.

In some examples, the dev-like test system 208 enables a second version that is developed using the development system 206 to be deployed for analysis, testing, and/or troubleshooting prior to being released for production. In some examples, the dev-like test system 208 enables deployment of the second version, mimicking production deployment, and provides troubleshooting tools to enable troubleshooting of issues that may arise.

In some examples, the automated test and development platform can automatically determine a set of tables to be handled in an upgrade. Specifically, a trace and analyze tool 242 in the dev-like test system 208 traces all activities during handling (e.g., analysis, testing, and/or troubleshooting) of the second version. In some examples, the trace and analyze tool 242 can be implemented by running functionalities, such as one or more database (DB) traces to acquire information about tables that are created, read, and written to the database 222 during the development. In some examples, the trace and analyze tool 242 can include and/or operate with data dictionary tools and/or troubleshooting tools used to deploy the second version to the database tables (e.g., tables in database 220 and 222) or output the set of tables to be written directly. In some examples, a DB trace can be provided as computer-executable code that monitors and is responsive to changes in a database, such as the database 222. For example, if a table is created in a database, a DB trace can generate a trace providing details of the table (e.g., table name, fields, field types).

In some implementations, the trace and analyze tool 242 is called to record (or is monitoring to record) every change created during the development to the database tables through deployment and troubleshooting of the second version in the dev-like test system 208 (e.g., database tables in database 222). The resulting sets of tables are collected (e.g., create unions to the tables acquired each time) and are sent to the configuration system 214 to be stored in the upgrade configuration database 228. In some examples, the upgrade configuration database 228 is the central database of the automated test and development platform 200.

In some implementations, after an iteration of development of the second version, the second version can be deployed to the dev-like test system 208 for deployment, analysis, and troubleshooting. In some implementations, the trace and analyze tool 242 generates a trace representative of tables written as a result of deployment of the second version to the dev-like test system 208. This set of tables can be referred to as a set of deploy tables denoted as "T_depl_rw" (e.g., "depl" referring to deploy). In some examples, this is performed for every change or for a consolidated set of changes (e.g., a "weekstone" as a collection of all changes by all developers of one week, or a "takt result" for agile takt-based development processes). In this manner, T_depl_rw is readily available early in development. That is, the set of tables T_depl_rw is provided from development of the new version, from the outset of deploying tables during development. The resulting set of tables is collected and sent to the upgrade configuration database 228.

In some implementations, as part of deployment to the dev-like test system 208 also results in a data dictionary activation program reading and writing tables. In some implementations, the trace and analyze tool 242 generates a trace representative of tables read and/or written based on activation. In some examples, these sets of tables can be referred to as activation tables and include a set of activation read tables denoted as "T_act_r" (a set of read only tables) and a set of activation read-write tables denoted as "T_act_rw" (a set of readable and writable tables) (e.g., "act" referring to activation). It is noted that the set of tables T_act_r and the set of tables T_act_rw are also tables that the database system will read and write during a subsequent upgrade (i.e., post-development upgrade to production) to compute the target data dictionary structures. In some examples, database objects accessed as part of activation (DB_act) can be traced. The resulting sets of tables and data objects are collected and sent to the upgrade configuration database 228.

In some examples, troubleshooting of the deployment in the dev-like test system 208 can occur. During troubleshooting, tables can be read and/or written. In some implementations, the trace and analyze tool 242 generates a trace representative of tables read and/or written based on troubleshooting. In some examples, these sets of tables can be referred to as troubleshooting tables and include a set of troubleshooting read tables denoted as "T_tr_r" (a set of read only tables) and a set of troubleshooting read-write tables denoted as "T_tr_rw" (a set of readable and writable tables) (e.g., "tr" referring to troubleshooting). In some examples, database objects accessed as part of activation (DB_act) can be traced. The resulting sets of tables and data objects are collected and sent to the upgrade configuration database 228.

In general, this analysis and tracing includes identifying which transactions and tools in the system the developers use to do the troubleshooting (e.g., the DDIC transaction, the batch monitoring system), creating an automatic run-simulator to automatically call these transactions and tools automatically, and running the set of run-simulators for the defined set of transactions and tools for each milestone (e.g., each weekstone, each takt result).

Accordingly, through the development, testing, and troubleshooting of the new version, the sets of tables T_depl_rw (results of deployed changes), T_act_r/T_act_rw (results of tracking during testing), and T_tr_r/T_tr_rw (results of troubleshooting) are generated and are stored in the upgrade configuration database 228. In some examples, and as described in further detail herein, the configuration generator 230 in the configuration system 214 can generate an update configuration based on these sets of tables by merging results across iterations of development.

In some examples, merging includes, at the beginning of development, initiating an empty set of tables T_x, and iteratively, during development, the set of tables T_x is collected at each milestone (e.g., weekstone, takt result) or deploy event (e.g., deploy to production at end of development), resulting in a set of tables T_x_i, where i is a counter indicating development iteration or deployment. At each iteration i, to compute the set of tables T_x, a union of the set of tables T_x and the set of tables T_x_i is determined. In some examples, tables added during the iteration i are exposed for user (e.g., displayed to a user on a display). As an output of the merging, the following sets of tables are provided:

| | | |
|---|---|---|
| T_act_r<br>T_act_rw | Activation Tables (e.g., determined from DB traces during deployment), | Tables the system reads and writes during the upgrade to compute the target data |
| T_tr_r<br>T_tr_rw | Troubleshooting Tables (e.g., determined from DB traces during troubleshooting). | dictionary structures.<br>Tables the system reads and writes during troubleshooting of problems during the upgrade. |
| T_depl_rw | Deploy Tables (e.g., determined from DB tracing of development changes). | Tables, being deployed with new content. |
| DB_act | Activation Objects (e.g., objects accessed during activation). | The DB objects being accessed. |
| DB_tr | Troubleshooting Objects (e.g., objects accessed during troubleshooting). | The DB objects being accessed. |

Figure 2B:
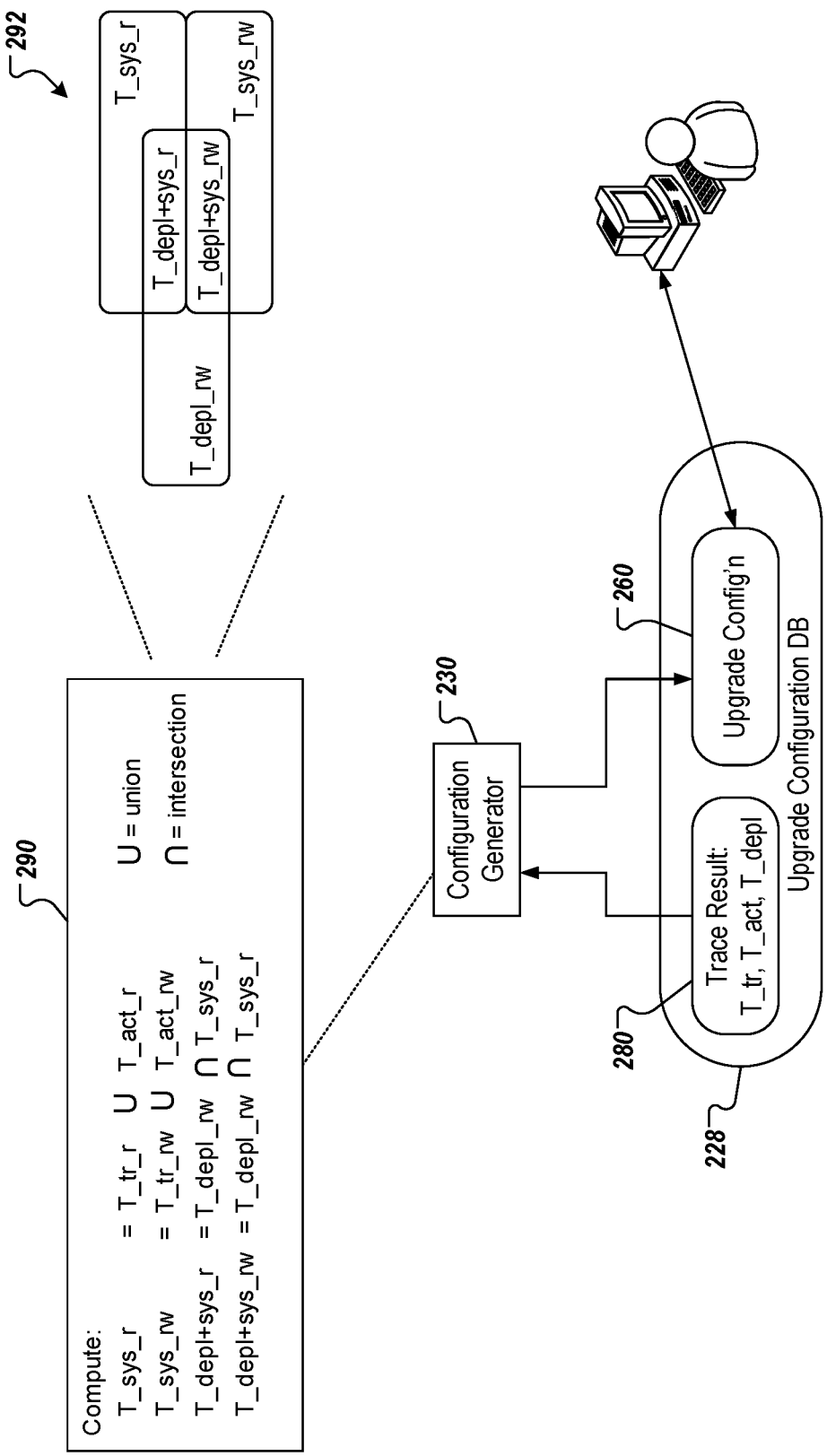
FIG. 2B depicts example tables and table relationships computed by the automated test and development platform of the present disclosure.

FIG. 2B depicts example tables and table relationships computed by the automated test and development platform of the present disclosure. In some implementations, the configuration generator 230 can read the trace results (i.e., the sets of tables T_depl_rw, T_act_r/T_act_rw, and T_tr_r/T_tr_rw) from the upgrade configuration database 228 and generate an upgrade configuration 260 based thereon.

In some examples, the update configuration includes categories of tables, such as "deploy target structure," "deploy content," and "to-be-cloned." In some examples, the tables in the category "deploy target structure" are the set of tables to be established with target structure of the new version (V2) being deployed to (e.g., deployed to the green runtime). In some examples, sets of tables in the category "deploy target structure" include a set of tables "T_sys_r" and a set of tables "T_sys_rw." In some examples, the tables in the category "deploy content" are the set of tables that new content are to be deployed to (e.g., deployed to the green runtime). In some examples, the tables in the category "deploy content" includes a set of tables "T_depl+sys_r" and a set of tables "T_depl+sys_rw." In some examples, the tables in the category "to-be-cloned" are tables that are to-be-cloned (copied) from the previous version (e.g., tables used by the blue runtime) for the second version (e.g., tables also used by the green runtime). In some examples, the tables in the category "to-be-cloned" includes a set of tables "T_sys_rw" and a set of tables "T_depl+sys_r."

In some implementations, the configuration generator 230 generates the upgrade configuration 260 to include the sets of tables T_sys_r, T_sys_rw, T_depl+sys_r, T_depl+sys_rw, and the database objects DB_sys. For example, and as depicted in FIG. 2B, the configuration generator computes the sets of tables T_sys_r, T_sys_rw, T_depl+sys_r, T_depl+sys_rw from the sets of tables T_depl_rw, T_act_r, T_act_rw, T_tr_r, and T_tr_rw, which are stored in the upgrade configuration database 228. In further detail, the configuration generator 230 makes the following computations 290:

| | |
|---|---|
| $T\_sys\_r = T\_tr\_r \cup T\_act\_r$ | (1) |
| $T\_sys\_rw = T\_tr\_rw \cup T\_act\_rw$ | (2) |
| $T\_depl + sys\_r = T\_depl\_rw \cap T\_sys\_r$ | (3) |
| $T\_depl + sys\_rw = T\_depl\_rw \cap T\_sys\_rw$ | (4) |
| $DB\_sys = DB\_act \cup DB\_tr$ | (5) | where $\cup$ represents union and $\cap$ represents intersection. The relationships of the tables in "deploy target structure," (DTS) "deploy content," (DC), and "to-be-cloned" (TBC) categories are depicted in a table relationship 292. More particularly, the categories are summarized as follows:

| Set of Tables | Categor(y/ies) |
|---|---|
| T_sys_r | DTS |
| T_sys_rw | DTS, TBC |
| T_depl + sys_r | DC, TBC |
| T_depl + sys_rw | DC |

After the computations 290, the sets of tables and respective category information are included in the upgrade configuration 260, which is stored in the upgrade configuration database 228. In some examples, a key column can be used in the upgrade configuration database 228 to distinguish different versions of the upgrade configuration 260.

In some implementations, a user interface (UI) is provided to visualize the sets of tables and the corresponding categories. In some examples, the visualization of the table relationship 292 is also displayed and is populated with more detail in the UI. The UI can be transmitted and displayed on a computer for a user (e.g., developer, expert) to review. In some examples, the user is able to add or override some of the data in the sets of tables. For example, additional tables can be added to the sets of tables by the experts for the reason that these additional tables are known by the experts to be essential to the upgrade, but is absent from the sets of tables displayed in the UI. In some implementations, new categories of tables can be added by the developers. For example, a category "shared between blue and green" can be added to the upgrade configuration 260 to record number ranges and singleton numbers shared in different versions of the application. The changes (added or overridden data) of the upgrade configuration 260 made by the user can be written back to the upgrade configuration database 228.

Referring again to FIG. 2A, in some implementations, the configuration distributor 232 in the configuration system 214 may trigger a constraint tool 240 in the development system 206 to constrain further development of the application. For example, in response to sending the upgrade configuration 260 to the upgrade system 216, the constraint tool 240 is triggered to constrain further development. In some examples, the upgrade configuration 260 includes a list of tables to be constrained in any further development. For example, because the zero-downtime procedure (e.g., the blue-green deployment discussed herein) relies on some level of compatibility of the older version (e.g., V1) and the new version (e.g., V2), further changes or developments to the data in the set of tables that are essential to the upgrade may cause incompatibility of two versions. As a result, in order to prevent the next development from changing the tables in a way that is not supported by the current zero-downtime procedure, the development constraint tool 204 in the development system 206 can be configured to selectively alert based on the upgrade configuration 260. The alert can be generated by the development constraint tool 204 when a developer using the development system 206 would like to make changes that could result in incompatibility. In some examples, the alert can include the changes and the data corresponding to the changes. In some examples, the alerts are not only shown to the developer of the development system 206, but also be sent through UI to be displayed to the experts. The experts can evaluate and analyze the conflicts between the constraints and the current development. Further, the experts are able to solve the situation through the UI, such as revoke the changes in the sets of the tables or add an individual action for the tables with changes in the update procedure. In some examples, the development constraint tool 204 prohibits the developers to make any changes that are related to the data mentioned in the upgrade configuration 260.

In some implementations, the configuration distributor 232 sends the upgrade configuration 260 to the assembly tool 250 in the upgrade system 216. The assembly tool 250 assembles an upgrade package 262 of the new version (e.g., V2) of the application. The assembly tool 250 can further extend the upgrade package 262 with the data in the upgrade configuration 260 when the assembly tool 250 receives the upgrade configuration 260. In some examples, and as described herein, the upgrade configuration 260 includes the sets of tables to create target definition, a list of DB objects to create in the access schema of V2 and table sets and handling configuration during upgrade. As a result, the sets of tables and the required handling of the tables in the upgrade can be added in the upgrade package 262. Also, the target structures of all the tables in the sets discussed above can be added to the package. For the DB artifacts (i.e., the DB views) required to be created in the access schema of V2, a statement or metadata definition allowing to compute the statement are added to the package (which is denoted as "DB_sys"). In some examples, the statement is computed out of the new DDIC definitions in the target release repository (i.e., the DDIC definition used in V2). When the upgrade package 262 is assembled, the upgrade package can be sent to the assembly system 210 for further deployment of V2 (e.g., deployment to the customer side 204).

In some implementations, the upgrade package 262 is sent to the upgrade tool 278 at the customer side 204. In some examples, the upgrade package 262 includes table target definitions, DB object create statements and table sets and handling configuration during upgrade. When the upgrade tool 278 receives the upgrade package 262, the data dictionary tools 274 in the production system 212 cooperate with a G #1 (e.g., green number 1) installer of the upgrade tool 278 to start installation of V2.

Figure 3A:
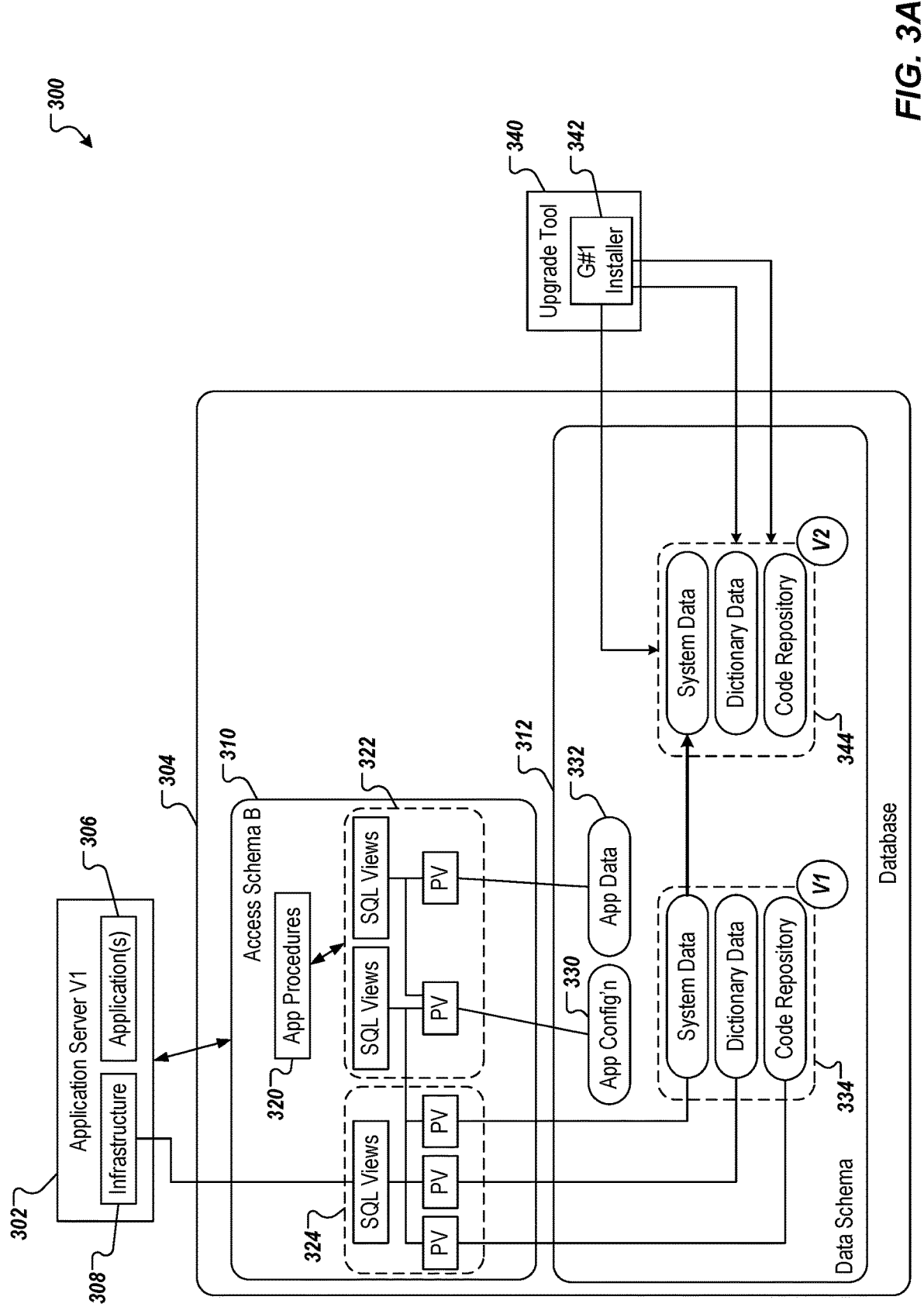
FIGS. 3A-3E depicts an example zero-downtime upgrade in accordance with implementations of the present disclosure.

FIGS. 3A-3E schematically depict at least a portion of an example zero-downtime upgrade in accordance with implementations of the present disclosure. With particular reference to FIG. 3A, a system 300 includes an application server 302 and a database system 304. The application server 302 hosts one or more applications 306 and an infrastructure component 308, which correspond to a first version (V1). The application server 302 and the access schema 310 correspond to a blue runtime in the context of a blue-green deployment. In the context of the present disclosure, an upgrade is to be performed to move from V1 to a second version (V2).

In the example of FIG. 3A, the database system 304 includes an access schema 310 and a data schema 312. In the context of blue-green deployment of an upgrade (e.g., a blue runtime for production use of V1, a green runtime for deployment of V2, and subsequent production switch from blue to green), introduced above, the access schema 310 can be considered a blue access schema (Access Schema B). In some examples, the access schema 310 enables components executing in the application server 302 to interact with data stored in the database system 304. In the depicted example, the access schema 310 includes application procedures 320, application views 322, and system views 324. In the depicted example, the data schema 312 includes application configuration data 330, application data 332, and infrastructure data 334. In some examples, the application views 322 enable views into the application configuration data 330 and the application data 332. In some examples, the system views 324 enable the infrastructure component 308 to obtain views on the infrastructure data 334. Example infrastructure data includes, without limitation, system data, dictionary data, and a code repository. The infrastructure data 334 corresponds to V1.

In accordance with implementations of the present disclosure, an upgrade from V1 to V2 can be initiated by an upgrade tool 340 using an upgrade package, such as the upgrade package 262 of FIG. 2A. The upgrade package includes an upgrade configuration, such as the upgrade configuration 260 of FIG. 2A, provided in accordance with implementations of the present disclosure. In some examples, the upgrade tool 340 includes a G #1 installer 342 that deploys infrastructure data 344 based on the upgrade configuration and at least a portion of the infrastructure data 334. As a result, the G #1 installer 342 can coordinate with data dictionary tools (e.g., the DDIC tools 274 of FIG. 2A) to run and compute the required target structure for all of the tables during the upgrade.

In further detail, as the upgrade starts, V1 includes the data schema 334 and the access schema 310 is locked against further changes. That is, though users can still access the data schema 334 through the access schema 310, no software changes (e.g., patches) can be done to V1. Thus, the set of tables T_depl_rw stored in the data schema 334 is locked and become read-only tables. The G #1 installer 342 copies the tables in the category "to-be-cloned" (i.e., the set of tables T_sys_rw and the set of tables T_depl+sys_r) from the data schema 334 to the data schema 344. That is, the data schema 334 is copied to provide the data schema 344. In some examples, the tables in the category "to-be-cloned" includes tables in the data dictionary and code repository. The G #1 installer 342 creates tables identical to data dictionary and code repository and clone the data thereof in. Further, the G #1 installer 342 computes the required structural changes by comparing "as-is" structure of the tables in the database schema 334 and the target definition of the tables in the upgrade configuration. The G #1 installer 342 adjusts the structure of tables based on the comparison. In some examples, the adjustment to the structure of tables includes adding fields in the tables by executing a database data definition language (DDL) statement.

In some implementations, the G #1 installer 342 creates a continuous replication for tables in a first set of tables (System Data) determined based on the following computation:

[T_sys_r∪T_sys_rw]−T_depl_rw

The first set of tables is replicated in the data schema 344 from the data schema 334. Continuous replication includes replicating changes made to the table(s) through the blue runtime during upgrade until eventually moving from the blue runtime to the green runtime. It can be noted that the tables in the first set of tables are not locked in V1 from being written to during the upgrade.

The G #1 installer 342 can also call a software-import tool to deploy software to a second set of tables determined based on the following computation:

T_depl+sys_r∪T_depl+sys_rw

Further, content of V2 is deployed into tables of the data schema 344 (e.g., records related to changes can be inserted or updated). As a result, the database tables through the data schema 344, including tables corresponding to system data, dictionary data, and code repository, are all prepared in the data schema 344.

Figure 3B:
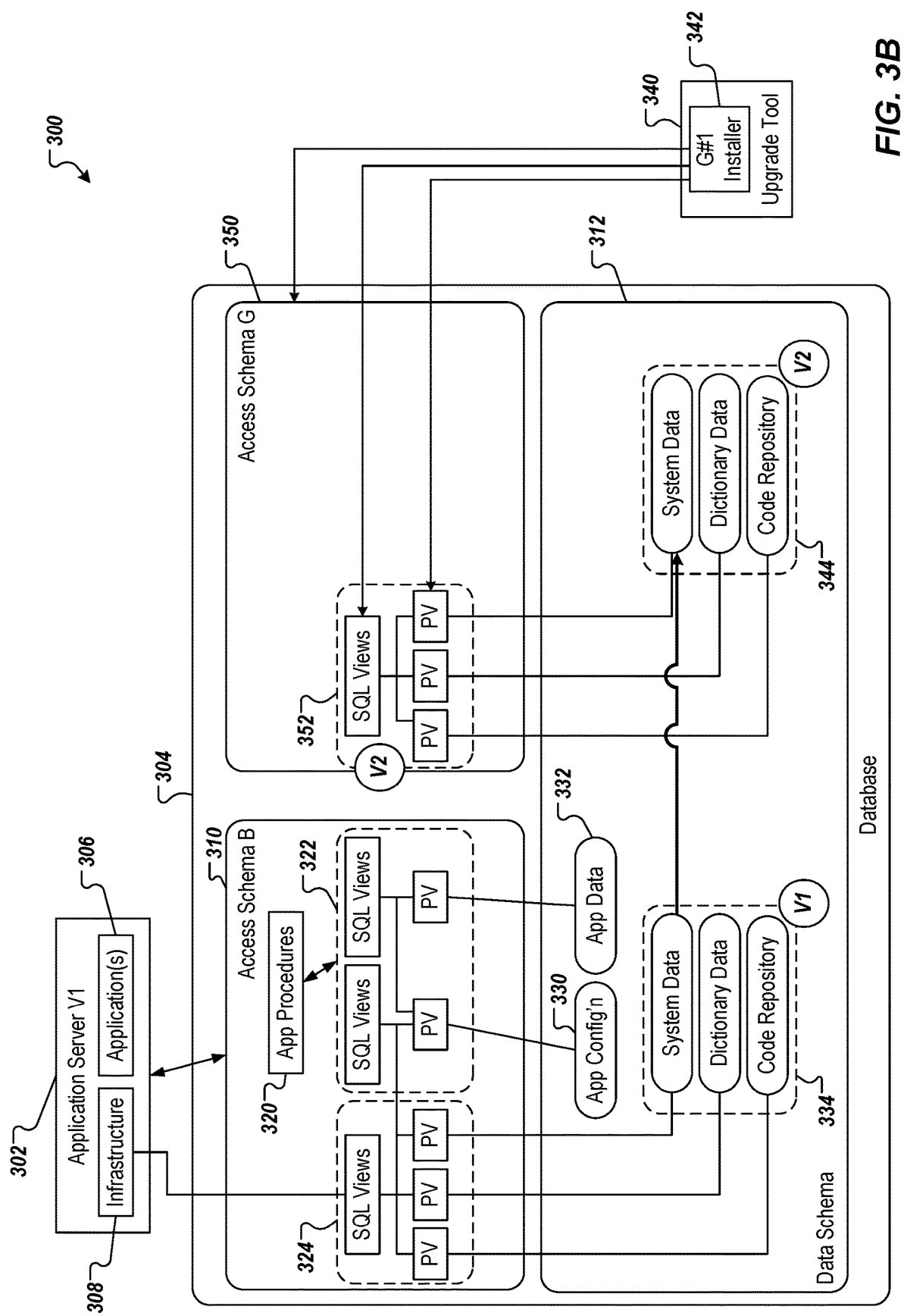

Referring to FIG. 3B, after preparing the data schema 344, the G #1 installer 342 creates an access schema 350 (Access Schema G for green runtime) and system views 352. The G #1 installer 342 creates the access schema 350, which includes projection views, for accessing the infrastructure data in the data schema 344 (i.e., the system data, the dictionary data and the code repository). In some examples, the system views 352 include projection views to a set of tables computed as:

T_sys_r∪T_sys_rw

The G #1 installer 342 also creates the database objects DB_sys (e.g., DB views) of the access schema 350 based on table target definitions and create statement recorded in the upgrade configuration.

Figure 3C:
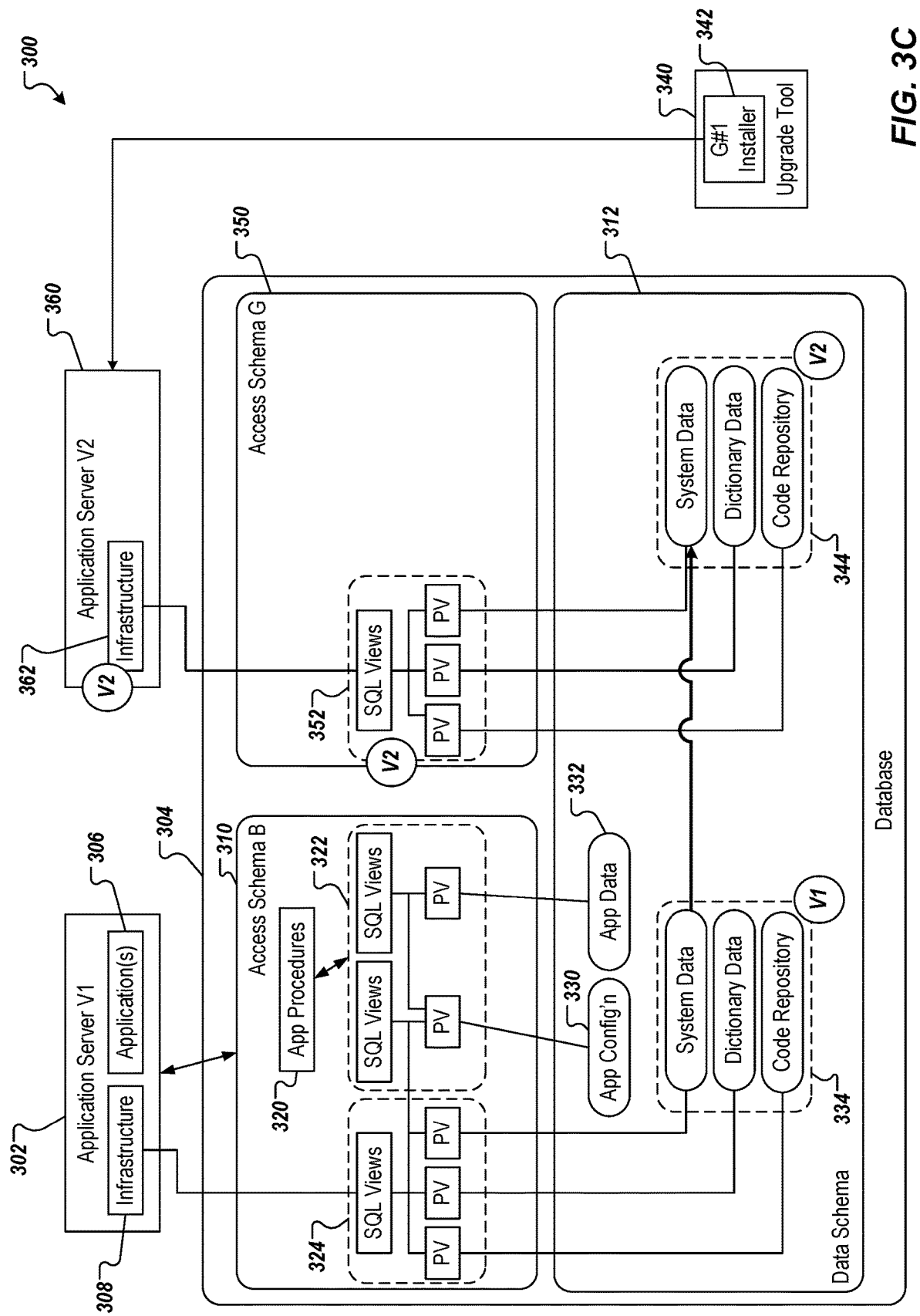
Figure 3D:
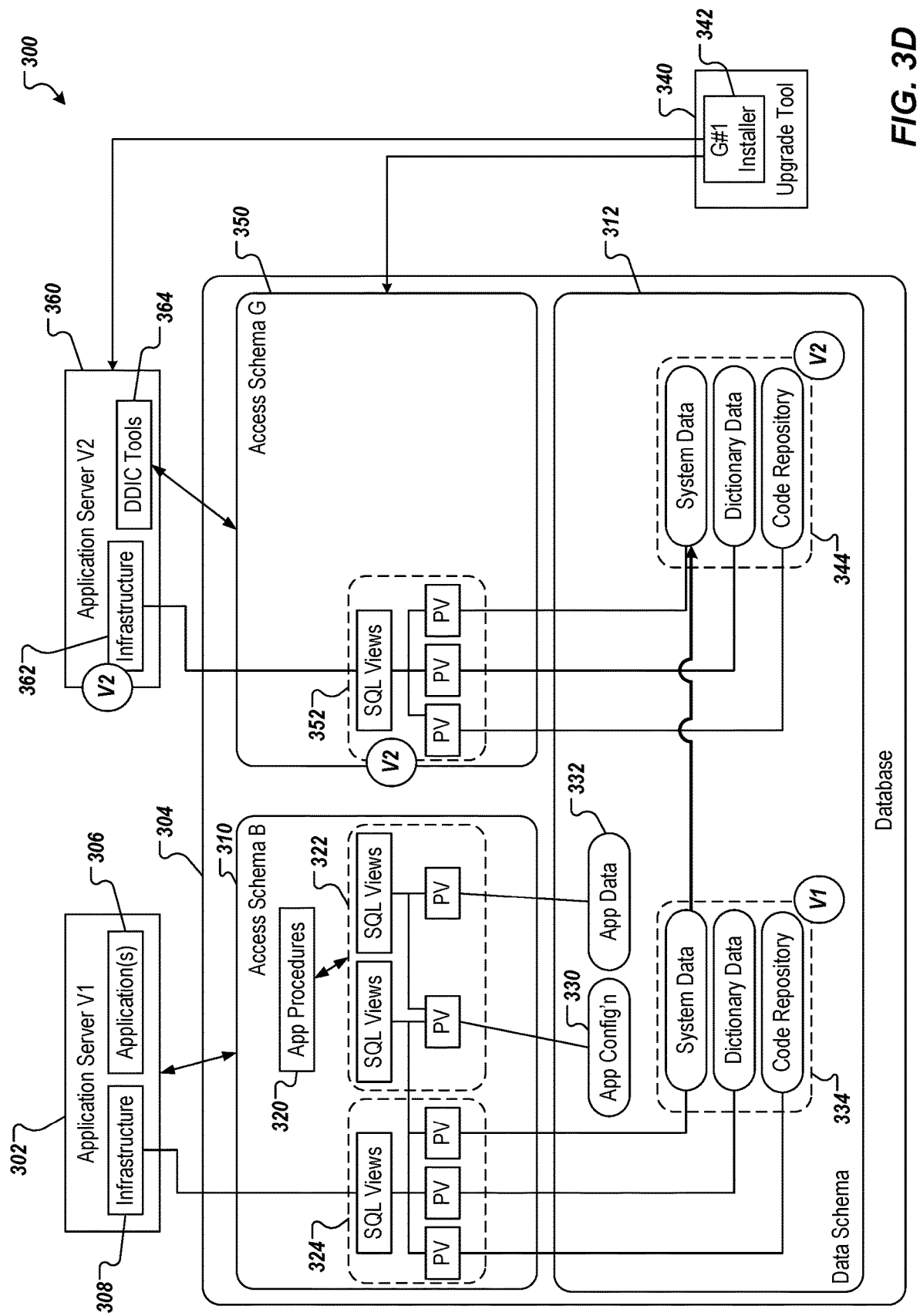
Figure 3E:
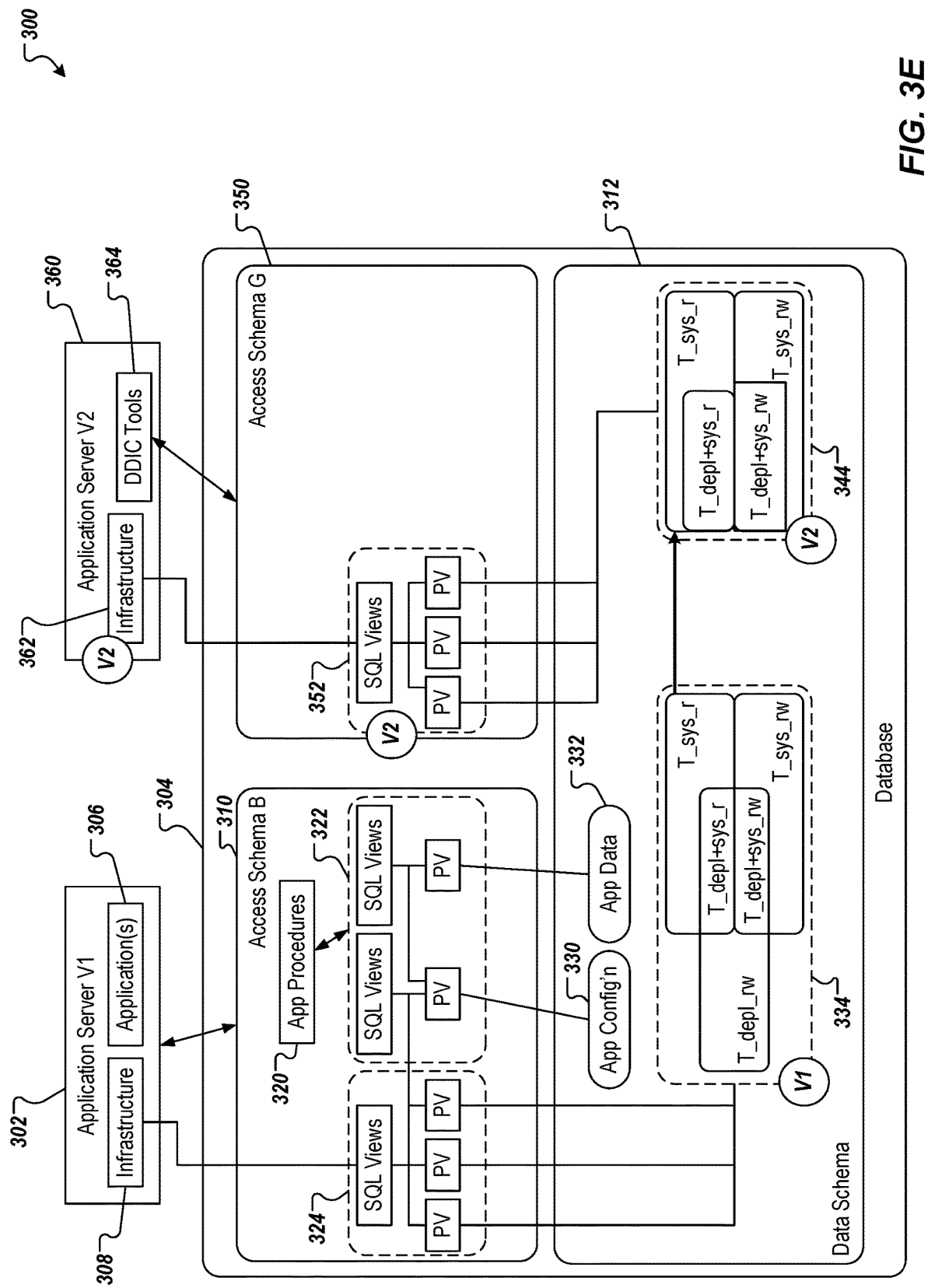

Referring to FIG. 3C, after the data schema 344 and access schema 350 are ready, the G #1 installer 342 starts execution of an application server 360, which provides the application V2. The application server 360 executes an infrastructure module 370 that is able to access the data in the data schema 344 through the infrastructure views 352 of the access schema 350. Referring to FIG. 3D, at this stage of the upgrade, data dictionary tools 372 are provided in the application server 360. Referring to FIG. 3E, the infrastructure module 370 is able to access the tables in the data schema 344 and the data dictionary tools 372 are able to interact with the access schema 350. The infrastructure module 370 accesses tables of the data dictionary and the code repository. After the replication of system data is complete, application views are also created in the access schema 350. Eventually, a switch-over is performed through which production use moves to the green runtime (e.g., the application server 360, the access schema 350, the data schema 344), and the blue runtime (e.g., the application server 302, the access schema 310, the data schema 334) is removed.

Figure 4:
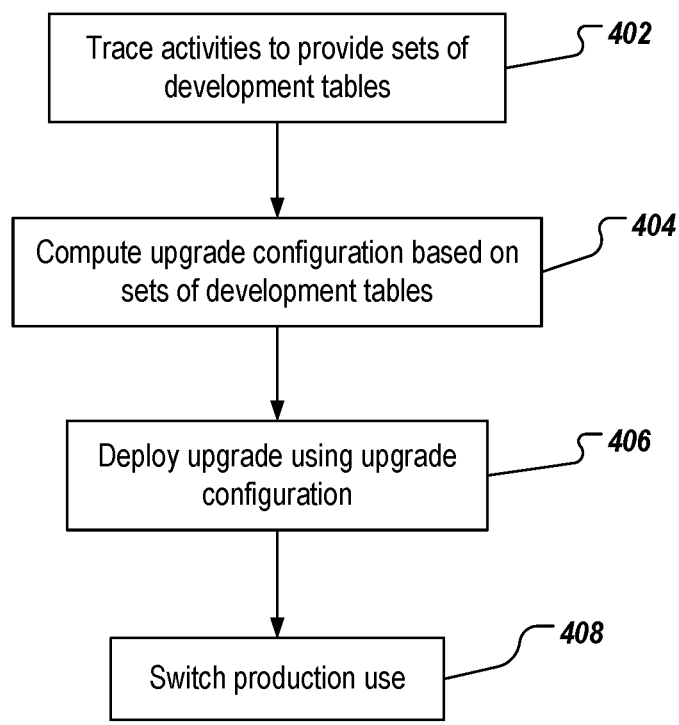
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices (e.g., the server system 108 of FIG. 1). The example process 400 is executed for upgrade of an application from a first version to a second version.

Activities are traced to provide sets of development tables (402). For example, and as described in detail herein, during development of the second version within a development environment, activities are traced to determine sets of development tables. The second version includes changes, relative to the first version, that are incompatible with the first version. The set of development tables includes a set of deploy tables (T_depl_rw), sets of activation tables (T_act_r, T_act_rw), and sets of troubleshooting tables (T_tr_r, T_tr_rw). In some examples, the set of deploy tables is provided from a first database trace representing changes during the development of the second version of the application. In some examples, the sets of activation tables are provided from a second database trace representing tables accessed during activation. In some examples, the sets of troubleshooting tables are provided from a third database trace representing tables accessed during troubleshooting.

An upgrade configuration is computed based on the sets of development tables (404). For example, and as described in detail herein, the upgrade configuration defines a set of tables to deploy the changes during an upgrade, the set of tables being computed based on the sets of development tables. In some examples, computing an upgrade configuration includes defining a set of system read tables as a union of a set of troubleshooting read tables of the sets of troubleshooting tables and a set of activation read tables of the sets of activation tables, the set of tables including the set of system read tables. In some examples, computing an upgrade configuration includes defining a set of system read-write tables as a union of a set of troubleshooting read-write tables of the sets of troubleshooting tables and a set of activation read-write tables of the sets of activation tables, the set of tables including the set of system read-write tables. In some examples, computing an upgrade configuration includes defining a set of deploy and system read tables as an intersection of the set of deploy tables and the set of system read tables. In some examples, computing an upgrade configuration includes defining a set of deploy and system read-write tables as an intersection of the set of deploy tables and the set of system read-write tables.

An upgrade is deployed using the upgrade configuration (406). For example, and as described in detail herein, an upgrade tool deploys the upgrade during a zero-downtime upgrade using a first-second deployment (e.g., blue-green deployment). In some examples, during the upgrade, production use of the first version of the application is continued using a first runtime at least partially including a first data schema (e.g., blue runtime), and a second runtime (e.g., green runtime) is established at least partially by defining a second data schema within the database system using the upgrade configuration, the second data schema including the set of tables.

Production use is switched (408). For example, and as described in detail herein, after the upgrade is complete and the second runtime is ready for production use, the first runtime is halted, production use is switched to the second runtime (V2), and the first runtime is deleted. In some examples, the upgrade tool calls the first application server (e.g., blue) to run a soft shutdown (e.g., no login to the first application server is possible, no new transactions can be started in the first runtime, upon a completed transaction (pending transaction that is committed), the user is logged off). In some examples, the second application server (e.g., blue) is opened, so users can login, and a dispatcher is called to re-direct users to the second application server.

Figure 5:
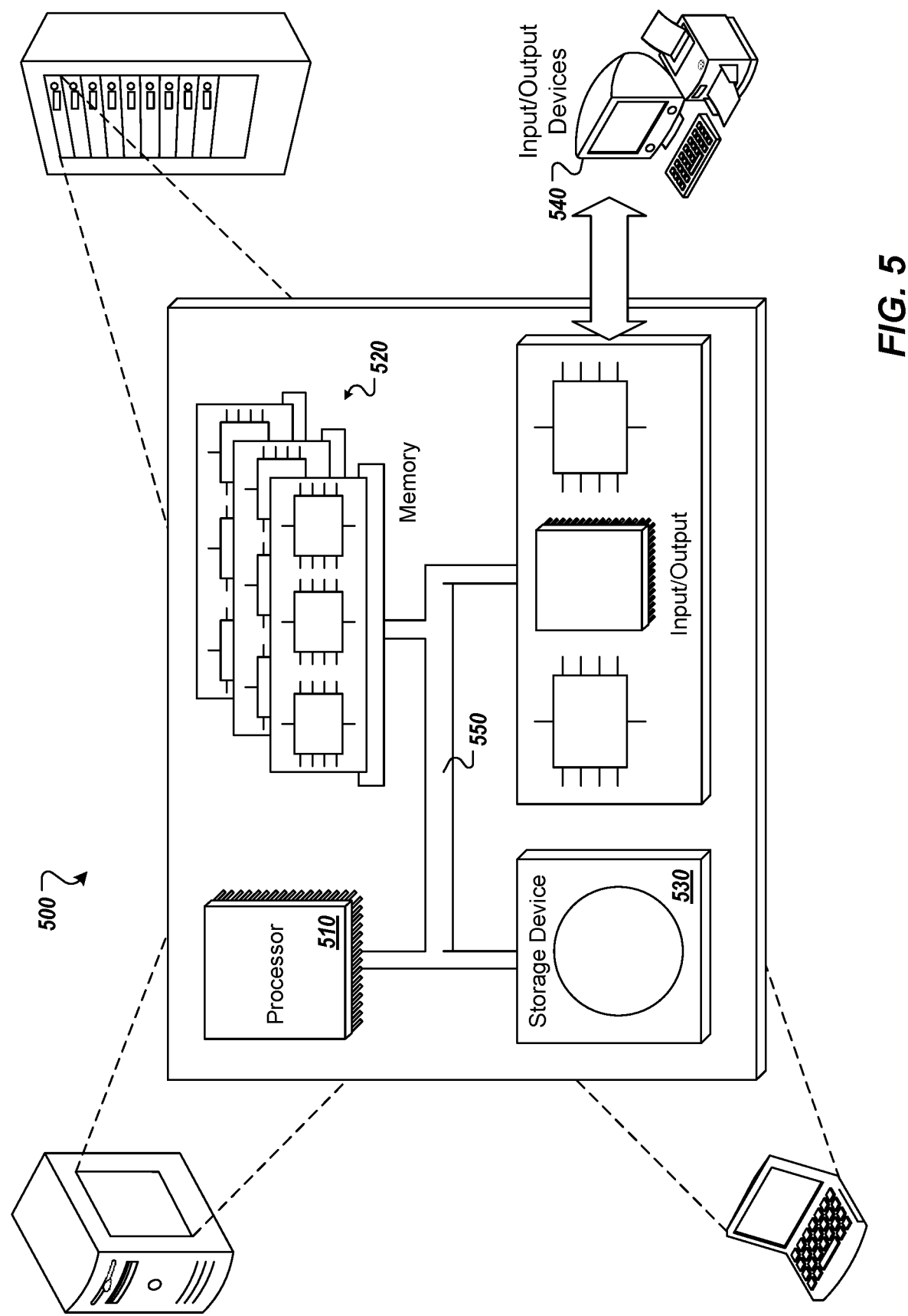
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for upgrade of an application from a first version to a second version, the application interacting with data stored in a database system, the method being executed by one or more processors and comprising:
   during development of the second version within a development environment, tracing activities to determine sets of development tables, the second version comprising changes that are incompatible with the first version, the set of development tables comprising a set of deploy tables, sets of activation tables, and sets of troubleshooting tables;
   computing, by a configuration generator, an upgrade configuration based on the set of development tables, the upgrade configuration defining a set of tables to deploy the changes during an upgrade, the set of tables being computed based on the sets of development tables;
   during the upgrade:
      continuing production use of the first version of the application using a first runtime at least partially comprising a first data schema, and
      establishing a second runtime at least partially by defining a second data schema within the database system using the upgrade configuration, the second data schema comprising the set of tables; and
   completing the upgrade by switching production use to the second version of the application from the first version of the application.

2. The method of claim 1, wherein computing an upgrade configuration based on the set of development tables at least partially comprises:
   defining a set of system read tables as a union of a set of troubleshooting read tables of the sets of troubleshooting tables and a set of activation read tables of the sets of activation tables, the set of tables comprising the set of system read tables; and
   defining a set of system read-write tables as a union of a set of troubleshooting read-write tables of the sets of troubleshooting tables and a set of activation read-write tables of the sets of activation tables, the set of tables comprising the set of system read-write tables.

3. The method of claim 2, wherein computing an upgrade configuration based on the set of development tables at least partially comprises:
   defining a set of deploy and system read tables as an intersection of the set of deploy tables and the set of system read tables; and
   defining a set of deploy and system read-write tables as an intersection of the set of deploy tables and the set of system read-write tables.

4. The method of claim 1, wherein:
   the set of deploy tables is provided from a first database trace representing changes during the development of the second version of the application;
   the sets of activation tables are provided from a second database trace representing tables accessed during activation; and
   the sets of troubleshooting tables are provided from a third database trace representing tables accessed during troubleshooting.

5. The method of claim 1, further comprising constraining, by a development constraining tool, continued development of the second version at least partially in response to computing the upgrade configuration.

6. The method of claim 1, wherein the upgrade configuration defines a set of system database objects that are to be deployed to the green runtime during the upgrade, the set of system database objects being computed as an intersection of a set of deploy database objects and a set of troubleshooting database objects determined during development of the second version.

7. The method of claim 1, wherein defining a second data schema within the database system using the upgrade configuration comprises copying tables and content of tables in first data schema to the second data schema, and continuously replicating at least a portion of changes in the first data schema to the second data schema occurring in production use of the first version of the application using the first runtime during the upgrade.

8. A non-transitory computer-readable storage medium coupled to one or more processors and having instructions stored thereon which, when executed by the one or more processors, cause the one or more processors to perform operations for upgrade of an application from a first version to a second version, the application interacting with data stored in a database system, the operations comprising:
   during development of the second version within a development environment, tracing activities to determine sets of development tables, the second version comprising changes that are incompatible with the first version, the set of development tables comprising a set of deploy tables, sets of activation tables, and sets of troubleshooting tables;
   computing, by a configuration generator, an upgrade configuration based on the set of development tables, the upgrade configuration defining a set of tables to deploy the changes during an upgrade, the set of tables being computed based on the sets of development tables;
   during the upgrade:
      continuing production use of the first version of the application using a first runtime at least partially comprising a first data schema, and
      establishing a second runtime at least partially by defining a second data schema within the database system using the upgrade configuration, the second data schema comprising the set of tables; and
   completing the upgrade by switching production use to the second version of the application from the first version of the application.

9. The computer-readable storage medium of claim 8, wherein computing an upgrade configuration based on the set of development tables at least partially comprises:
- defining a set of system read tables as a union of a set of troubleshooting read tables of the sets of troubleshooting tables and a set of activation read tables of the sets of activation tables, the set of tables comprising the set of system read tables; and
- defining a set of system read-write tables as a union of a set of troubleshooting read-write tables of the sets of troubleshooting tables and a set of activation read-write tables of the sets of activation tables, the set of tables comprising the set of system read-write tables.

10. The computer-readable storage medium of claim 9, wherein computing an upgrade configuration based on the set of development tables at least partially comprises:
- defining a set of deploy and system read tables as an intersection of the set of deploy tables and the set of system read tables; and
- defining a set of deploy and system read-write tables as an intersection of the set of deploy tables and the set of system read-write tables.

11. The computer-readable storage medium of claim 8, wherein:
- the set of deploy tables is provided from a first database trace representing changes during the development of the second version of the application;
- the sets of activation tables are provided from a second database trace representing tables accessed during activation; and
- the sets of troubleshooting tables are provided from a third database trace representing tables accessed during troubleshooting.

12. The computer-readable storage medium of claim 8, wherein operations further comprise constraining, by a development constraining tool, continued development of the second version at least partially in response to computing the upgrade configuration.

13. The computer-readable storage medium of claim 8, wherein the upgrade configuration defines a set of system database objects that are to be deployed to the green runtime during the upgrade, the set of system database objects being computed as an intersection of a set of deploy database objects and a set of troubleshooting database objects determined during development of the second version.

14. The computer-readable storage medium of claim 8, wherein defining a second data schema within the database system using the upgrade configuration comprises copying tables and content of tables in first data schema to the second data schema, and continuously replicating at least a portion of changes in the first data schema to the second data schema occurring in production use of the first version of the application using the first runtime during the upgrade.

15. A system, comprising:
- a computing device; and
- a computer-readable storage device coupled to the computing device and having instructions stored thereon which, when executed by the computing device, cause the computing device to perform operations for upgrade of an application from a first version to a second version, the application interacting with data stored in a database system, the operations comprising:
  - during development of the second version within a development environment, tracing activities to determine sets of development tables, the second version comprising changes that are incompatible with the first version, the set of development tables comprising a set of deploy tables, sets of activation tables, and sets of troubleshooting tables;
  - computing, by a configuration generator, an upgrade configuration based on the set of development tables, the upgrade configuration defining a set of tables to deploy the changes during an upgrade, the set of tables being computed based on the sets of development tables;
  - during the upgrade:
    - continuing production use of the first version of the application using a first runtime at least partially comprising a first data schema, and
    - establishing a second runtime at least partially by defining a second data schema within the database system using the upgrade configuration, the second data schema comprising the set of tables; and
  - completing the upgrade by switching production use to the second version of the application from the first version of the application.

16. The system of claim 15, wherein computing an upgrade configuration based on the set of development tables at least partially comprises:
- defining a set of system read tables as a union of a set of troubleshooting read tables of the sets of troubleshooting tables and a set of activation read tables of the sets of activation tables, the set of tables comprising the set of system read tables; and
- defining a set of system read-write tables as a union of a set of troubleshooting read-write tables of the sets of troubleshooting tables and a set of activation read-write tables of the sets of activation tables, the set of tables comprising the set of system read-write tables.

17. The system of claim 16, wherein computing an upgrade configuration based on the set of development tables at least partially comprises:
- defining a set of deploy and system read tables as an intersection of the set of deploy tables and the set of system read tables; and
- defining a set of deploy and system read-write tables as an intersection of the set of deploy tables and the set of system read-write tables.

18. The system of claim 15, wherein:
- the set of deploy tables is provided from a first database trace representing changes during the development of the second version of the application;
- the sets of activation tables are provided from a second database trace representing tables accessed during activation; and
- the sets of troubleshooting tables are provided from a third database trace representing tables accessed during troubleshooting.

19. The system of claim 15, wherein operations further comprise constraining, by a development constraining tool, continued development of the second version at least partially in response to computing the upgrade configuration.

20. The system of claim 15, wherein the upgrade configuration defines a set of system database objects that are to be deployed to the green runtime during the upgrade, the set of system database objects being computed as an intersection of a set of deploy database objects and a set of troubleshooting database objects determined during development of the second version.

\* \* \* \* \*